L. E. WATERMAN.
SULKY PLOW.
APPLICATION FILED APR. 12, 1915.
1,233,734.
Patented July 17, 1917.
3 SHEETS—SHEET 1.
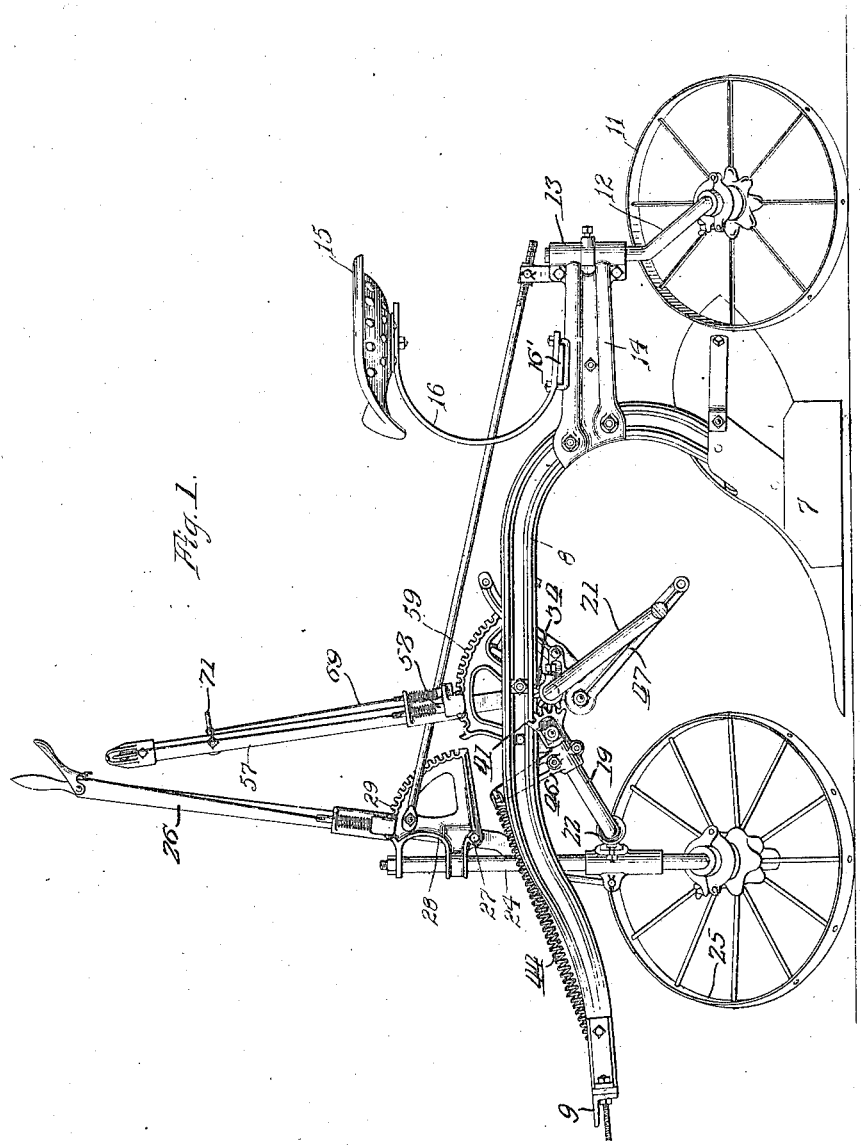

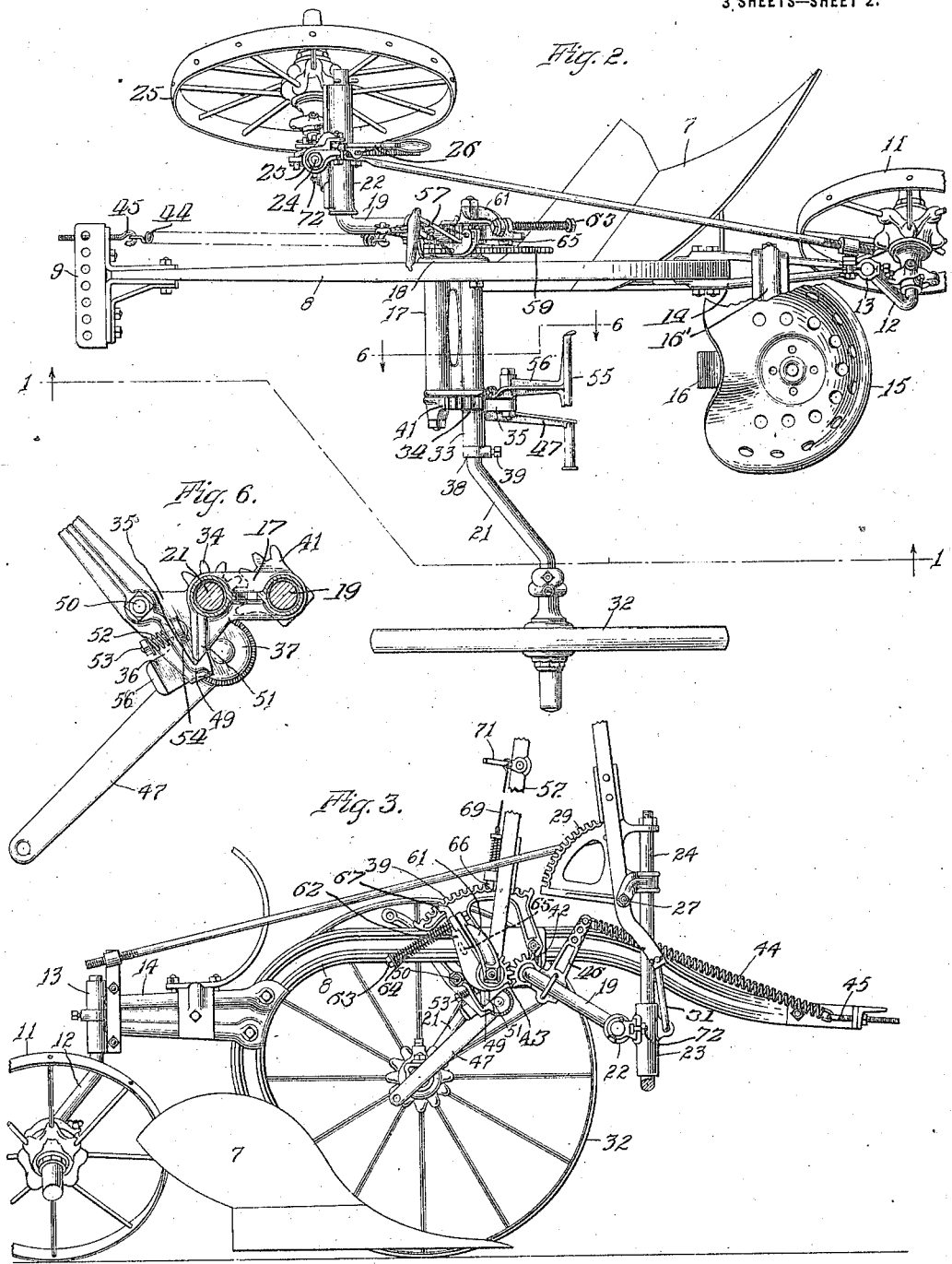

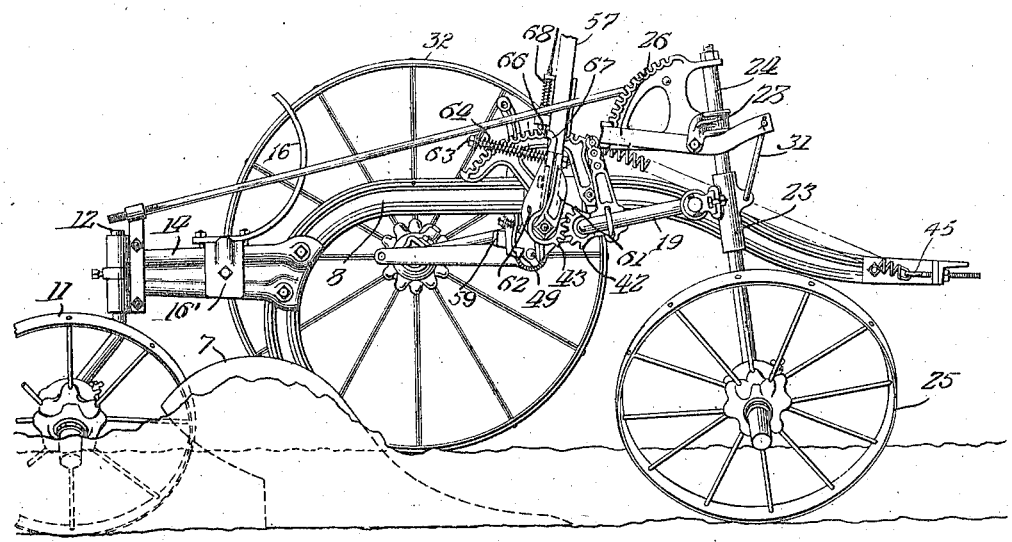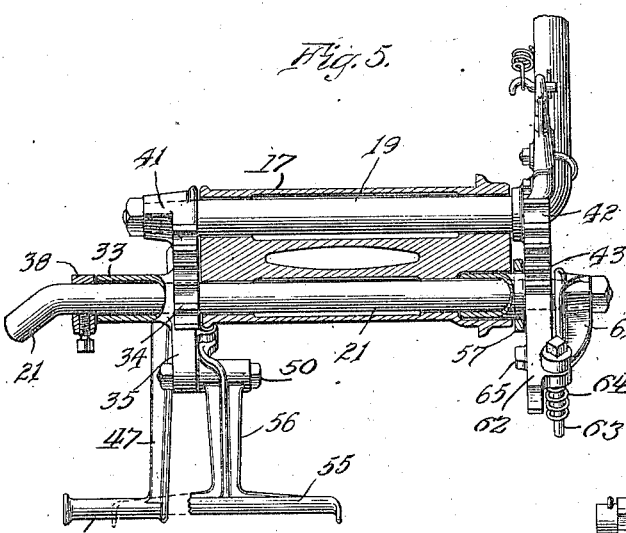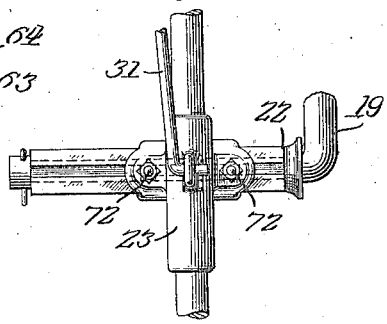

UNITED STATES PATENT OFFICE.

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

SULKY-PLOW.

1,233,734.      Specification of Letters Patent.      Patented July 17, 1917.

Application filed April 12, 1915. Serial No. 20,856.

*To all whom it may concern:*

Be it known that I, LEWIS E. WATERMAN, a citizen of the United States, residing at Rockford, in the county of Winnebago and State of Illinois, have invented certain new and useful Improvements in Sulky-Plows, of which the following is a specification.

This invention relates to sulky plows and has for one of its primary objects the provision of a plow which will be simple in construction, light in weight, and at the same time strong and durable and which can be easily manipulated by the driver to raise or lower the plow bottom and to cause it to plow to any required depth.

Sulky plows as constructed prior to my present invention, have comprised a frame upon which the plow beam was adjustably mounted, the frame being also, in most instances, capable of adjustment relatively to the supporting wheels for the purpose of leveling the plow or causing it to run at a desired angle. My present invention is designed to eliminate the plow frame from the construction, thereby materially decreasing the weight of the plow as a whole and consequently lightening the draft and diminishing the cost of manufacture.

Another object of the invention is to provide a novel and highly effective foot lift mechanism for raising and lowering the plow beam, this mechanism being constructed so as to be operable by small expenditure of energy and including means for automatically locking the plow in raised position.

My invention also contemplates the provision of manually operable depth controlling mechanism which, when set in a predetermined position, limits the depth to which the plow may run.

My invention also aims to provide novel means for locking the plow in the ground, thereby insuring that a furrow of a predetermined depth will be made.

Other objects are to provide a yielding connection between the land wheel and the plow beam which will lend flexibility to the construction as a whole and increase its riding qualities, to provide improved means for leveling the plow bottom by adjusting the position of the furrow wheel with respect to the plow beam, to provide a permanent connection between the axles of the furrow wheel and the land wheel, such that upon raising the plowing tool the land side of the bottom of the plowing tool will be raised higher than its furrow side, whereby upon drawing the plowing tool from plowed ground onto level ground the bottom of the plowing tool will be automatically leveled, and to provide other novel and advantageous features of construction which will be better understood by reference to the following description when considered in connection with the accompanying drawings. Referring to the drawings—, Figure 1 is a side elevation of a plow embodying my invention, the land wheel and a portion of its shaft being removed;

Fig. 2 is a plan view of the plow shown in Fig. 1;

Fig. 3 is an elevation looking from the furrow side at the plow showing the position of the parts when the plow bottom is elevated above the ground;

Fig. 4 is a similar view showing the plow bottom in working position;

Fig. 5 is a horizontal sectional view through the journal bearings for the crank members;

Fig. 6 is an enlarged detail sectional view on the line 6—6 of Fig. 2; and

Fig. 7 is an enlarged detail view of the adjustable connection between the front furrow wheel support and its supporting crank, looking at the front thereof.

On the drawings reference character 7 indicates the plow bottom carried by the plow beam 8, the forward end of which is equipped with the adjustable hitch 9 on which the draft clevis is attached. The rear end of the plow beam is carried by the rear wheel 11 mounted on a post 12, which is swiveled in a suitable bearing 13 carried by the rear end of an arm 14 rigidly bolted or otherwise secured to the beam 8. The driver's seat 15 carried by a spring member 16 is preferably mounted upon an arm 16′.

A casting 17, including a vertical web 18 which is rigidly bolted to the plow beam intermediate its ends is shaped to provide transversely extending elongated journal bearings for the crank axles 19 and 21, respectively. The outer end of the crank member 19 is journaled in a horizontal bearing 22 carried by a sleeve 23, which is vertically adjustable upon the post 24 whose lower end is bent outwardly to form the axle for the furrow wheel 25. The sleeve 23 is adjustable longitudinally of the journal bearing 22 in a suitable or preferred manner, the journal bearing in the present instance, being provided with a longitudinally extending way upon which the sleeve 23 is slidably mounted and held rigidly in position by bolts 72. By this construction the front furrow wheel may be adjusted on the crank laterally with respect to the plow frame. The purpose of this lateral adjustment of the furrow is to be able to position the said wheel to tread properly in a furrow regardless of the width thereof. In other words, when plow bottoms of different widths are used, the vertical or side wall of the furrow will be formed at different points laterally with respect to the frame, and by so adjusting the front furrow wheel laterally, it will be properly positioned to tread against the side wall of the furrow. The vertical position of the sleeve 23 on the post 24 is regulated by means of hand lever 26 pivoted at 27 upon a bracket 28 rigidly mounted upon the upper end of the post and shaped to provide a notched sector 29, the arm of the lever 26 being connected with the sleeve 23 by means of a link 31 as shown in Figs. 1, 3, and 4. It will be manifest that when the lever 26 is swung in a clockwise direction about its pivot, viewing Fig. 1, the sleeve 23 and consequently the crank member 19 will be raised relatively to the furrow wheel. This adjustment is provided for the purpose of leveling the plow bottom and is not designed to be used for raising and lowering the plow to vary the depth of operation.

The crank member 21 serves as the axle for the land wheel 32 as shown in Fig. 2. It will be noted that the crank member 19 extends forwardly from its journal bearing 17, while the crank member 21 extends rearwardly from its bearing, and that the crank member 19 is of less radial length than the crank member 21. Each of the crank members being connected at its outer end with one of the supporting wheels, it is obvious that as the crank members are swung or partially rotated simultaneously, but in opposite directions, the plow beam will be raised and lowered relative to the supporting wheels by connected crank members. The mechanism for swinging the crank members in their journals will now be described.

Upon crank member 21 at the end of the casting 17, I have loosely mounted a sleeve 33 shaped as shown in Figs. 2 and 6 to provide a toothed sector 34 and a bracket comprising the arms 35, 36 and 37. A collar 38 held in position by a set screw 39 is employed to maintain the sleeve 33 in a proper position on the crank member 21. A toothed sector 41 of greater radius than the sector 34 is fixedly mounted upon the inner end of the crank member 19 to mesh with the sector 34, so that when the sleeve 33 is given a rotative movement, this movement will be translated through the intermeshing sectors to the crank member 19. A toothed sector 42 is also fixed on the crank member 19, at the opposite end of the casting 17 and a toothed sector 43 is fixed to a sleeve loosely mounted upon the inner end of the crank member 21, the said sector 43 being in position to mesh with the sector 42, and said toothed sectors 42 and 43 being of equal radii. The sector 43 is connected with the crank member 21 through the agency of a yieldable joint described hereinafter. It will thus be observed that when the crank member 19 is rocked in its journal, the crank member 21 will be simultaneously rocked in the opposite direction. This rocking of the crank members about their outer ends which are fixedly supported with respect to the ground, is utilized to raise and lower the plow beam. It will be further observed that I have provided a train of reduction gearing between the sector 34 and the crank members 19 and 21 whereby to obtain a mechanical advantage in raising the plow beam, and that by this arrangement of gearing the crank members 19 and 21 will be rocked in unison at equal speeds. By this means I obtain a structure wherein the cranks upon being rocked in unison by the reduction gearing mechanism carry their supporting wheels through unequal vertical distances with respect to the plow beam, the land wheel being moved a greater distance than the furrow wheel. It is obvious, therefore, that by the provision of the novel mechanism for raising and lowering the plow beam, the level of the plow bottom is changed during raising and lowering of the same, the land side of the plow bottom being raised higher than its furrow side when the plow is in a position with its front furrow wheel resting in a furrow, and a very desirable mechanical advantage is obtained in the operation of raising the plow beam. A coil spring 44 attached at one end by a hook 45 to the front of the plow beam and at the other end to an arm 46 carried by and extending upwardly from the crank member 19 serves to counterbalance the weight of the plow beam, thereby assisting the raising thereof.

The crank members are worked in their bearings to perform the raising and lowering operations, by mechanism which will now be described.

The arm 37 of the sleeve 33 has adjustably attached thereto a downwardly and rearwardly extending foot lever 47 provided with a laterally extending portion 48 by means of which the lever may be depressed to rock the sleeve 33 and the sector 34 carried thereby in a counterclockwise direction, viewing Fig. 6. This movement of the lever will raise the plow beam as will be readily understood and the mechanical advantage of the levers will be increased by reason of the train of reduction gearing mentioned above. When the beam has been elevated to the required height, it is automatically locked in raised position by a latch 49 pivoted at 50 upon the arm 35 and adapted to engage behind a shoulder 51 formed integrally with the casting 17. A spring 52 carried by a bolt 53 mounted on an ear 54 of the arm 35 normally urges the latch 39 into the position shown in Fig. 6. The arm of the latch extends upwardly and rearwardly and is provided at its extremity with a foot pedal or bar 55 adapted to be engaged by the foot of the driver. When it is desired to lower the plow into the ground, the driver simply pushes forwardly on the foot pedal 55, thereby first drawing the latch 49 from engagement with the shoulder 51, and afterward forcing the plow downwardly into the ground by reason of the fact that the rear face of the latch engages with a shoulder 56 carried on the arm 36 of the sleeve 33, so that forward pressure on the foot pedal rocks the sleeve 33 in a clockwise direction, viewing Fig. 6, to the lower plow beam.

For the purpose of limiting the lowering movement of the plow beam to thereby regulate the depth at which the plow will run, I have provided a hand lever 57 pivotally mounted on the inner end of the crank member 21 and provided with a hand latch 58 adapted to engage in the notches of a notched sector 59 rigidly mounted on the plow beam. An arm 61 rigidly mounted on the inner end of the crank member 21 is yieldingly connected with a similar arm 62 loosely mounted on the shaft, by a bolt 63 and a spring 64, as best shown in Fig. 4. The arm 62 is equipped on its inner face with an inwardly extending lug 65 positioned in alinement with the hand lever 57. When the plow beam is lowered, the levers 61 and 62 will move in a clockwise direction, viewing Fig. 4, until the lug 65 abuts against the lever 57, thereby arresting downward movement of the beam. By adjusting the lever 57 to various positions with respect to the notched sector 59, the depth to which the plow may be lowered can be regulated to a fine degree of nicety and the plow can be raised and lowered by means of the foot-operated mechanism without moving the lever 57, which remains in its set position so that the plow will be automatically set to the desired depth each time it is lowered. The spring 64 forming a yielding connection between the levers 61 and 62 permits limited oscillation of the crank member 21 occasioned by passage of the land wheel 32 over obstacles or uneven ground and provides a certain amount of flexibility to the machine, which adds to its riding qualities and relieves it of unnecessary strain.

In order to provide for locking the plow in the ground so that it will not run out when plowing hard or baked soil, I have mounted on the lever 57 an abutment 66 adapted to project downwardly into the path of and behind the upper end 67 of the lever 62. Since the lever 57 is locked to the notched sector, it will be obvious that counterclockwise movement of the lever 62, which is necessary in order for the plow beam to rise, is precluded by engagement of the end 67 with the abutment 66. A spring 68 normally tends to hold the abutment in the position shown in Fig. 4, but the abutment is connected by a line 69 with a crank handle 71 pivoted on the lever 57, as shown in Fig. 3, so that when the handle 71 is swung on its pivot in a clockwise direction, the abutment 66 is withdrawn from the path of the lever end 67, thereby permitting raising movement of the plow beam. If a handle 71 is positioned, as shown in Fig. 3, the plow will be automatically locked in the ground by the abutment 66 when it is lowered and the abutment 66 must be withdrawn by actuation of the handle 71 before the plow can be again raised out of the ground by the foot lever. In soil where the plow will of its own suction stay in the ground, the abutment 66 may be permanently withdrawn from operative position, thereby permitting the plow to be raised and lowered solely by foot manipulation and without touching the lever 57 or the handle 71.

It will be observed that the manipulation of my improved plow is very simple. When the plow is in elevated position, as shown in Fig. 3, it is automatically locked by the latch 49. When it is desired to lower the plow, forward pressure on the foot pedal 55 will first release the latch 49 and then force the plow into the ground. The depth to which the plow will go is determined by the position of the lever 57 and, if desired, the plow may be locked against raising movement by the abutment 66. The plow is raised, when desired, by the driver pushing forwardly with his foot on the pedal 48.

By this action the land side of the plow will be raised higher than the furrow side, and when the plow is drawn from the plowed ground onto level ground the drawing of the furrow wheels out of the furrow will raise the furrow side of the plow and thereby level the plow bottom.

It should be understood that while I have shown and described a preferred embodiment of my invention, the details of construction may be varied within considerable limits without departing from the essence of the invention as set forth in the following claims.

I claim:

1. The combination of an implement carrying-frame, a transversely disposed shaft journaled on the frame and having a crank connected to one of its ends, a supporting wheel mounted on the outer end of the crank, a shaft journaled on the frame parallel with the crank-shaft, a pair of intermeshing gears mounted on said shafts, loosely on the crank shaft and fixedly on the other, a second pair of intermeshing gears fixedly mounted on the shafts, the gears of one of said pairs being of different radii, and means for imparting rotary movement to the gear loose on the crank-shaft whereby the same will be rocked and its wheel moved vertically with respect to the frame.

2. In a plow, the combination of plow-carrying means, a crank shaft pivotally mounted on said means and equipped at its outer end with a supporting wheel, a segment-adjustable hand lever loosely mounted on the crank shaft, an arm movable with the crank shaft, and a member mounted on the hand lever and arranged to be carried in the path of the outer end of said arm, so that when the crank shaft has been swung to lower the plow-carrying means said member, having been set in a predetermined position by the hand lever, will prevent the said arm and consequently the crank shaft from being moved in a direction to raise the plow-carrying means, said member being movable independently of the hand lever to permit the plow-carrying means to be raised.

3. The combination of an implement-carrying frame, a crank pivotally mounted thereon and having a supporting wheel mounted on its outer end, a sector-gear bracket pivotally mounted on the frame, a train of reduction gearing between the sector-gear and the pivoted end of the crank, a foot-lever mounted on the said bracket for rocking the same and likewise its sector-gear whereby the crank may be rocked to raise the frame, a latch pivotally mounted on said bracket, and a member fixed on the frame and arranged to be automatically engaged by said latch when the frame has been raised whereby to hold the frame in raised position, said latch being releasable from said member to permit the frame to be lowered.

4. The combination of an implement-carrying frame, a bracket rigidly mounted thereon and shaped to provide a transversely disposed journal bearing, a crank journaled in said bearing and having a supporting wheel mounted on its outer end, a sector-gear bracket journaled loosely on the axle of the crank, gearing between the sector-gear and axle of the crank, a foot-lever mounted on said sector-gear bracket for oscillating the sector-gear whereby the crank may be rocked to raise the frame, a latch mounted on the sector-gear bracket, and a shoulder integral with the journal bracket and arranged to be automatically engaged by the latch when the frame has been raised whereby to hold the frame in raised position, the latch being releasable from the shoulder to allow the frame to be lowered.

5. In a plow, the combination of plow-carrying means, a supporting-wheel crank pivotally mounted thereon, a foot lever connected with said crank for rocking the same to raise the plow-carrying means, means for automatically locking the plow-carrying means in raised position upon the latter means being moved thereto, the last named means being foot-operated for releasing the plow-carrying means from raised position and for moving said means to lowered position, an adjustable lever, means coöperable between the crank and lever for limiting the lowered position of the plow-carrying means in accordance to the adjustment of said lever, and means coöperable between the crank and lever for automatically locking the plow-carrying means in lowered position.

6. In a plow, the combination of plow-carrying means, a supporting-wheel crank pivoted thereon, a foot-operated device connected with said crank for rocking the same to raise the plow-carrying means, an adjustable hand lever adapted to be set independently of said raising means to limit the working depth of the plow, and means coöperable between the hand lever and the crank for automatically limiting the working depth of the plow-carrying means when the latter is lowered as determined by the set position of said hand lever and for simultaneously locking the plow-carrying means against being raised.

7. In a plow, the combination of plow-carrying means, means for raising and lowering the same, an adjustable lever for determining the working depth of the plow, an arm connected with the said raising and lowering means so as to be rocked upon operation thereof, and means carried by said lever and coöperating with said arm to automatically lock the plow-carrying means against being raised from working position, said last named means being operable to permit of raising said plow-carrying means without disturbing the adjustment of said lever.

8. In a plow, the combination of plow-carrying means, a pair of supporting wheel cranks pivoted thereon, a pair of intermeshing gears mounted, one fixed and the other loose on said cranks, an arm integral with the loose gear, an arm fixed to the crank axle of the loose gear in proximity to the first named arm, a spring connection between said arms whereby the cranks may be rocked in unison and one rocked independently against the tension of said spring connection, and means for rocking the crank having the fixed gear, whereby to raise and lower the plow-carrying means.

9. In a plow, the combination of plow-carrying means, a pair of supporting-wheel cranks pivoted thereon, a pair of intermeshing gears mounted, one fixed and the other loose on said cranks, an arm integral with the loose gear, an arm fixed to the crank axle of the loose gear in proximity to the first named arm, a spring connection between said arms whereby the cranks may be rocked in unison and one rocked independently against the tension of said spring connection, an adjustable hand lever loosely mounted on the crank having the loose gear and arranged to form a stop for limiting movement of one of said arms so as to determine the working position of the plow.

10. In a plow, the combination of plow-carrying means, a land wheel and a furrow wheel crank pivotally mounted thereon, a pair of intermeshing gears mounted on said cranks one fixed on one crank and the other loose on the other crank, a connection between the loose gear and the crank upon which it is mounted so constructed as to constitute a positive connection when turned in one direction and a yielding connection when turned in the opposite direction, and means for rocking said cranks whereby to raise the plow-carrying means.

11. In a plow, the combination of plow-carrying means, a land wheel and a furrow-wheel crank pivotally mounted thereon, a pair of intermeshing gears mounted on said cranks one fixed on one crank and the other loose on the other crank, a pair of coöperating arms, one fixed to the said loose gear and the other to the crank thereof, said arms forming a positive connection between the loose gear and its crank when turned in one direction, a spring connection between said arms forming a yielding connection between said loose gear and its crank when turned in the opposite direction, and means for rocking the cranks to raise the plow-carrying means.

12. In a plow, the combination of plow-carrying means, a land and a furrow wheel crank pivotally mounted thereon, a pair of gears fixedly mounted on one of the cranks, a second pair of gears loosely mounted on the other crank and meshing separately with the first named gears, one of the pairs of intermeshing gears being of different radii, a yielding connection between one of the loose gears and its crank, and means for turning the other loose gear whereby to rock the cranks and raise the plow-carrying means.

13. In a plow, the combination of plow-carrying means, a land and a furrow wheel crank pivotally mounted thereon, a pair of intermeshing gears of substantially equal radii mounted upon and connected to the cranks so as to rock the same in unison, a second pair of intermeshing gears of unequal radii mounted on the cranks, the gear having the smaller radius being loose thereon and the other gear fixed, and means for turning the loose gear whereby to raise the plow-carrying means.

14. In a plow, the combination of plow-carrying means, a land and a furrow wheel crank pivotally mounted thereon, a pair of intermeshing gears mounted upon and connected to the cranks so as to rock the same in unison, a second pair of intermeshing gears mounted one loose and the other fixed on the cranks, the gears of one of said pairs being of unequal radii, and means for turning the loose gear whereby to raise the plow-carrying means.

15. In a plow, the combination of plow-carrying means, a land and a furrow wheel crank pivotally mounted thereon, a pair of intermeshing gears mounted one fixed and the other loose on the cranks, means connecting the cranks so that they will rock in unison, a foot lever and a spring-pressed latch connected with said loose gear, and a member fixed with respect to the plow-carrying means and positioned so that upon the foot lever being swung to raise the plow-carrying means a predetermined distance said latch will automatically engage said member and hold the plow-carrying means locked in raised position, said latch being releasable from locking position to allow the plow-carrying means to be lowered.

16. In a plow, the combination of a plow beam, a bracket fixedly secured thereto and having formed therein a pair of journals extending transversely of the beam, a pair of cranks mounted in said journals, a land wheel and a furrow wheel mounted on the cranks, a pair of intermeshing gears mounted on the cranks at the outer side of and adjacent to each end of the journals, one pair of gears being connected with the cranks for rocking the same in unison and the other pair having one gear loose and the other tight on the cranks, the loose gear being of less diameter than the other, and means for turning said loose gear whereby to raise the plow beam.

17. In a plow, the combination of plow-carrying means, a land and a furrow wheel crank pivotally mounted thereon, means connecting the cranks so that they will rock in unison, means for rocking the cranks to raise and lower the plow-carrying means, an adjustable lever adapted to be moved to a predetermined set position independently of the plow raising and lowering means, an arm connected with one of the cranks, means coöperable between the lever and the arm for so limiting movement of the latter when the plow-carrying means have been moved to working position as to automatically hold the said plow-carrying means against rising from its working position.

LEWIS E. WATERMAN.

Witnesses:
JOHN F. MCCANNA,
DELLA ATKINSON.

Copies of this patent may be obtained for five cents each, by addressing the "Commissioner of Patents, Washington, D. C."